Oct. 25, 1966    E. L. GOODSON ET AL    3,280,896
APPARATUS FOR UTILIZING VEHICLE HEATED AIR
Filed April 24, 1964    2 Sheets-Sheet 1
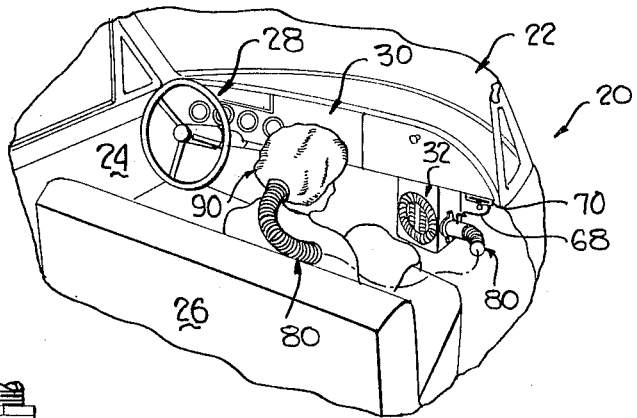
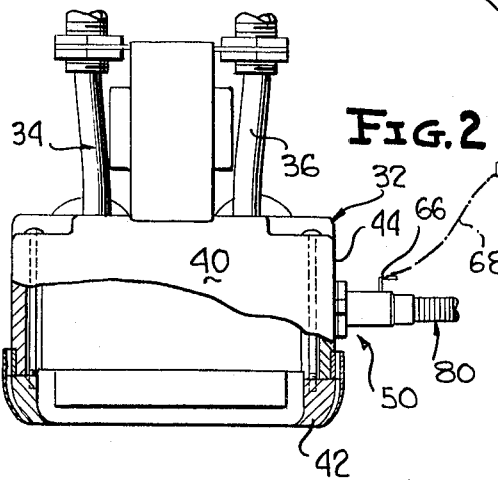
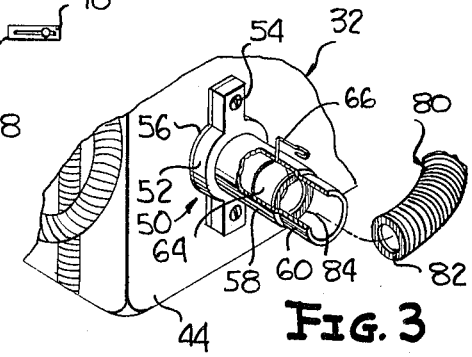
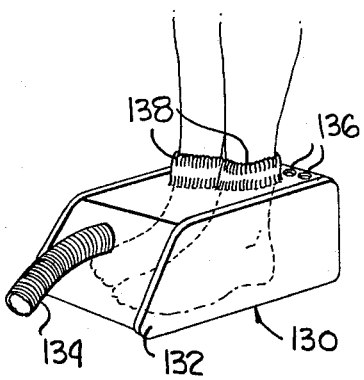
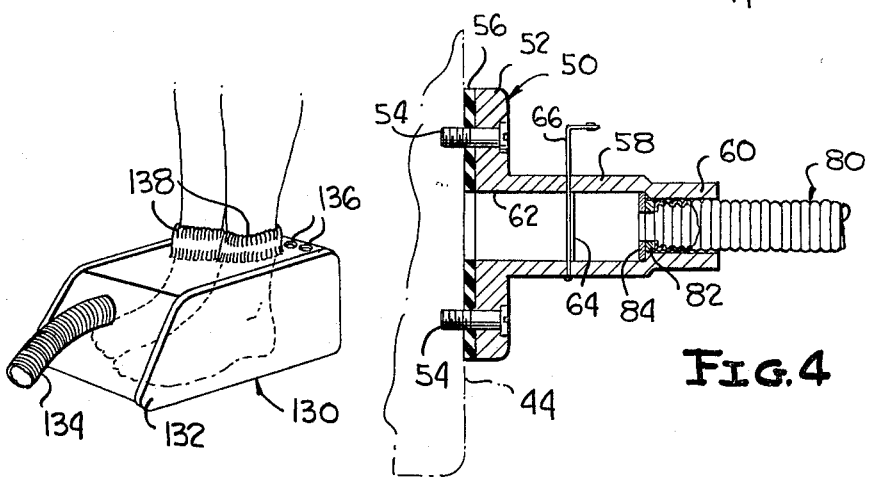
INVENTORS
ELMER L. GOODSON
& IRENE F. MADDY
BY Shoemaker and Mattare
ATTORNEYS

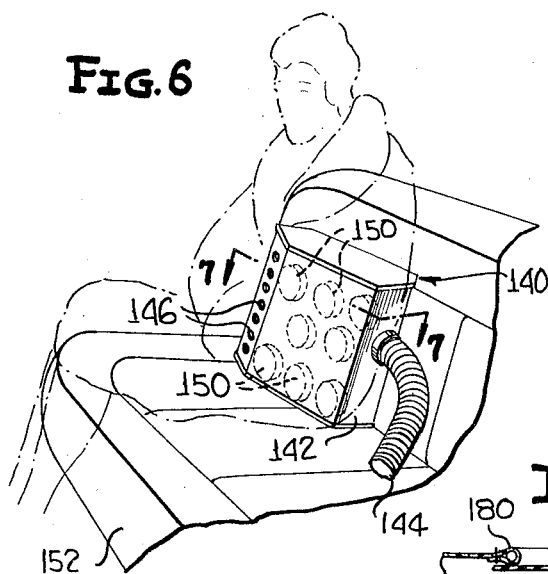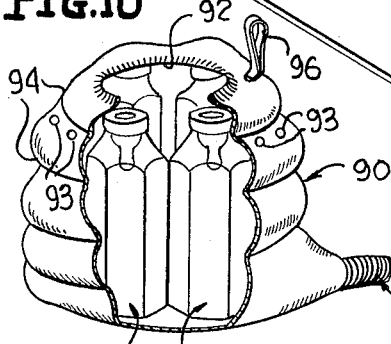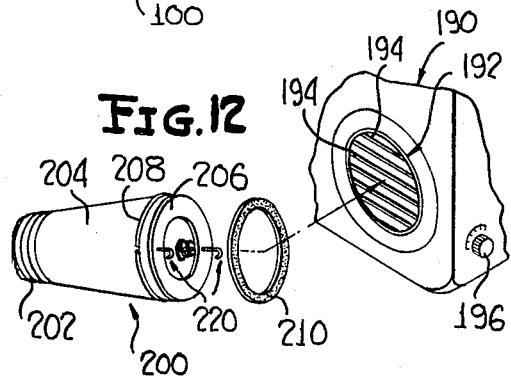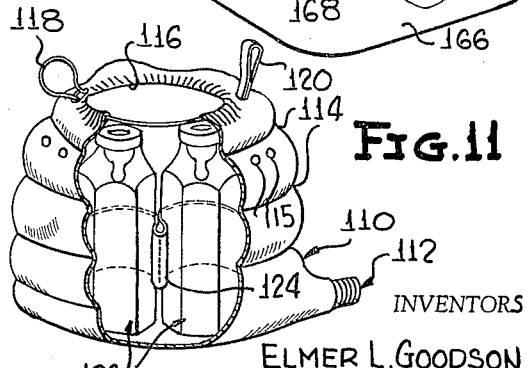

3,280,896
APPARATUS FOR UTILIZING VEHICLE HEATED AIR
Elmer L. Goodson, 41 Buntings Lane, Poquoson, Va., and Irene Firth Maddy, 4043 Catesby Jones Drive, Hampton, Va.
Filed Apr. 24, 1964, Ser. No. 362,372
3 Claims. (Cl. 165—43)

The present invention relates to new and novel heating or cooling apparatus for use with automotive vehicles, and more particularly to such apparatus which is adapted to be operatively connected with a source of air within an automotive vehicle.

The present invention contemplates a combination with the conventional automotive air system whereby the air discharge from any source of air within the automotive vehicle may be utilized for a desired end purpose.

The sources of air commonly found in automotive vehicles are the discharge portion of the heating means which of course provides warm air, the discharge portion of air-conditioning means which provides cool air, and in many instances a fresh air system is provided which simply admits fresh air into the interior of the car.

The apparatus of the present invention is adapted to be associated with any type of source of air no matter where it may be located within an automotive vehicle, and the particular source of air with which it is associated will be determined by the desired purpose for which the apparatus is employed.

The apparatus of the present invention includes a flexible conduit means having a connecting end portion which is adapted to be readily attached and sealed to any desired source of air within the vehicle. An attachment means is operatively connected with the opposite end of the flexible conduit means and is so designed as to direct the air in a desired manner to perform certain functions.

There may also be provided means within the system of the present invention for remotely controlling the flow of air through the system as desired.

The connecting means of the present invention may take different forms in accordance with the particular source of air with which it is adapted to be connected. Different modifications accordingly are disclosed herein to illustrate the different manners in which the flexible conduit means may be operatively associated with a source of air.

The attachment means of the present invention may take a number of different forms in accordance with the intended function. In one modification of the invention, the attachment means takes the form of a flexible enclosure means similar to a conventional hair drier bag which is adapted to fit about the head of a person to dry one's hair. With this type of construction, the enclosure means may be fitted about the head while a person rides along in the vehicle such that the person's hair is dried while riding in the vehicle.

The enclosure means as discussed above may also be provided with a strap for hanging it up in any desired position, and it may either be provided with an elastic about the opening formed therein, or a drawstring may be provided for adjusting the size of the opening.

The enclosure means as discussed above may be used for other purposes than for drying hair, and in a typical example food or beverages of different types may be disposed within the enclosure means and either heated or cooled depending on whether the flexible conduit means is operatively connected with a source of warm air or cool air.

The enclosure means may also be utilized for drying clothes or for circulating hot air, cold air or fresh air about any desired articles.

In addition, the enclosure means is so designed that it may be employed as a bag for carrying articles from and to the vehicle as the case may be. Enclosure means may also be provided with some sort of divider or pocket means therewithin to support various articles which may be desired to operatively dispose within the enclosure means.

In a modified form of the invention, a construction is specifically provided for warming the feet of a person, and this modification is of course so constructed as to permit one's feet to be inserted within the enclosure means provided for this purpose.

In a further modified form of the invention, an enclosure means is provided with spacer members for enabling the enclosure means to retain its shape and to be utilized as a heating pad as required.

In a still further modified form of the invention, the enclosure means may be of such a size and shape as to accommodate the body of a person. This type of construction is particularly useful in ambulances wherein it is often desired to maintain an accident victim or the like warm in order to overcome the ill effects of shock and similar conditions.

This latter described enclosure means provides an opening for receiving the neck and head portion of a person, and an elongated zipper means or the like is provided for opening and closing the enclosure means as desired. Hand holes are also provided at spaced portions of the enclosure means so as to permit an attendant to reach within the enclosure means as required to minister to a patient's body.

These hand holes are preferably automatically closed by flap means so as to prevent an excessive loss of warm air from the enclosure means, the enclosure means being provided with vent means so as to permit ready circulation of air therethrough.

In addition, the enclosure means of this last-mentioned modification may be provided with a thermometer or similar device for indicating the temperature within the enclosure means so that the desired amount of heat may be applied to a victim's body.

It is apparent that in each of the modifications of the present invention, either warm air, cool air or fresh air may be circulated through the enclosure means of the various modifications depending on the desired end effect. For example, if a person is travelling in a car, it may be desirable to maintain a baby bottle in a cooled condition until ready for use, and in this event the baby bottle may be disposed within the enclosure means and subjected either to fresh air when the surrounding air is cool enough or to the cool air from the air-conditioning system within the automotive vehicle. If at a later time it should be desired to warm the baby bottle for use, the conduit means may then be connected with a source of warm air so as to accomplish this result. It is accordingly apparent that the apparatus may be connected with different sources of air within the same automotive vehicle for accomplishing different ends.

An object of the present invention is to provide new and novel apparatus adapted to be utilized with the heating, cooling or fresh air system of an automotive vehicle.

Another object of the invention is the provision of apparatus which can be readily attached and sealed to the heating, cooling or fresh air system of an automotive vehicle to either receive hot air, cold air or fresh air therefrom as the case may be.

A further object of the invention is to provide air flow apparatus for use in automotive vehicles including means for remotely controlling the flow of air therefrom.

Still another object of the invention is to provide air flow apparatus in automotive vehicles including an attachment means adapted to fit about the head of a person for performing the function of drying the hair, particularly when attached to the heating system of the vehicle.

Still another object of the invention is the provision of air flow apparatus in an automotive vehicle including an attachment means which can be employed for warming or cooling food or beverages or for drying clothes and the like, and which can also serve as a carrying bag for carrying various articles.

A still further object of the invention is the provision of air flow apparatus in automotive vehicles which is specifically adapted to be utilized as a means for warming the feet of an occupant of the vehicle.

Yet another object of the invention is to provide air flow apparatus in an automotive vehicle which is especially adapted to be employed as a heating pad.

Still a further object of the invention is the provision of air flow apparatus in an automotive vehicle including enclosure means adapted to receive an entire human body except the head portion thereof in order to maintain the body at a desired temperature, this embodiment also affording the opportunity of utilizing the construction as a sleeping bag on long trips.

Other objects and many attendant advantages of the invention will become more apparent when considered in connection with the specification and accompanying drawings, wherein:

FIG. 1 is a top perspective view of the present invention in an automotive vehicle as employed for drying air;

FIG. 2 is an elevation view partly in section and partly broken away illustrating the apparatus attached to the heater of an automotive vehicle;

FIG. 3 is an enlarged top perspective view partly broken away and illustrating the manner of attaching the flexible conduit means to a connecting means associated with the heater;

FIG. 4 is a longitudinal section through the components shown in FIG. 3 and illustrating the components in assembled relationship;

FIG. 5 is a perspective view of a modification of the present invention adapted to be employed as a foot warmer;

FIG. 6 is a top perspective view illustrating a modified form of the invention adapted to be used as a heating pad;

FIG. 7 is a sectional view taken substantially along line 7—7 of FIG. 6 looking in the direction of the arrow;

FIG. 8 is a top perspective view illustrating a modified form of the invention adapted to be utilized for enclosing a human body;

FIG. 9 is a sectional view taken substantially along line 9—9 of FIG. 8 looking in the direction of the arrows;

FIG. 10 is a top perspective view of a form of the invention adapted to be utilized either as a hair drying device or for containing various articles, this view being partly broken away for the purpose of illustration;

FIG. 11 is a view similar to that shown in FIG. 10 illustrating a further modified form of the attachment means;

FIG. 12 is a top perspective view in exploded position illustrating a modified manner of attaching a flexible conduit means to a source of air; and FIG. 13 is a sectional view taken through the assembled components as illustrated in FIG. 12, and being broken away.

Referring now to the drawings wherein like reference characters designate corresponding parts throughout the several views, a first modification of the invention is illustrated in FIGS. 1–4 inclusive, and as seen in these figures, an automotive vehicle such as an automobile is indicated generally by reference numeral 20. It will be realized that the present invention is adapted to be utilized with any type of vehicle having an air flow system therein of the nature aforedescribed.

The automobile as illustrated particularly in FIG. 1 includes a conventional windshield 22, a side door 24, a front seat 26, a steering wheel 28 of conventional construction, and a forward instrument panel 30.

A conventional heater is indicated generally by reference numeral 32, this heater normally being mounted in position beneath the front panel of the automobile and in such a position as to direct air into the forward portion of the vehicle.

The heater may be of conventional construction and as seen in FIG. 2 may include inlet and outlet conduits 34 and 36 respectively for providing hot water from the engine block. The heater includes a main body portion 40 and a lower portion 42 which are of conventional construction and which provide suitable vents for directing air into the vehicle. A side wall 44 is provided for supporting the connecting means of the present invention.

It will be understood that the heater construction is ordinarily provided with control means which enables an operator to either direct hot air into the interior of the vehicle or fresh air may be admitted which need not necessarily be heated. In other words, this apparatus can be used under certain circumstances for admitting cool air into the interior of the vehicle as well as providing hot air depending on the weather conditions.

The connecting means of this particular modification, as especially seen in FIG. 4, is indicated generally by reference numeral 50 and includes a base portion 52 having a pair of openings formed therethrough which are adapted to receive cap screws 54 or the like which operatively secure the connecting means to the side wall of the heater. It is of course evident that this same base portion may be utilized for connecting the connecting means in operative position relative to any source of air which may be provided within the vehicle.

A gasket means 56 is compressed between the base portion 52 and the adjacent wall portion so as to provide an air-tight seal therewith. It will of course be understood that a suitable opening is provided in the side wall of the heater to provide communication with the connecting means, and if necessary a special hole may be drilled for this purpose. It will also be pointed out at this time that when the apparatus of the present invention is in operation, the other vent means from the heater are preferably closed in order that a maximum amount of air may be directed through the connecting means and into the apparatus of the present invention.

The connecting means includes an elongated portion 58 which terminates in a reduced tubular portion 60 which is adapted to support an associated end portion of a flexible conduit means hereinafter described.

The connecting means is provided with a bore 62 formed through portions 58 and 60 thereof, and air flow control means in the form of a butterfly valve 64 is pivotally mounted within bore 62 so as to control the flow of air therethrough, the butterfly valve being adapted to permit full air flow or to completely close off the air flow as desired.

Butterfly valve 64 is connected with an operating arm 66 which extends outwardly at the connecting means, a Bowden wire 68 being connected with operating arm 66 and in turn being operatively connected with an operating lever 70 mounted on the front panel of the automotive vehicle in a convenient position for manual operation.

It is apparent that lever 70 provides a means for remotely controlling the flow of air through the apparatus, and a person sitting in the front seat of the vehicle can thereby readily control the operation of the apparatus.

An elongated hollow flexible conduit means is indicated generally by reference numeral 80 and may be formed of any suitable substance such as plastic or the like. It is apparent that this flexible conduit means may if desired be formed integral with the connecting means aforedescribed, but it is considered preferable to employ a separate conduit means which can be readily stored wherever desired and then quickly attached in operative position.

Referring particularly to FIG. 4, one end portion of the conduit means is provided with an annular magnetic means 82 which is fixed to the end of the conduit means and which is adapted to cooperate with an annular magnetic means 84 fixedly mounted within portion 58 of the connecting means. The two magnetic means are of such a polarity as to attract one another and thereby serve to hold the end of the conduit means in operative position as shown in FIG. 4 with the adjacent portion of conduit means 80 supported within the tubular part 60 of the connecting means.

It is apparent that the conduit means may simply be slipped into the operative position shown in FIG. 4 whereupon it will be operatively retained in this position, and when it is desired to remove the conduit means it may be so removed simply by exerting a firm pull on the conduit means to break the magnetic attraction between portions 82 and 84.

A suitable attachment means indicated generally by reference numeral 90 is secured to the opposite end of the flexible conduit means 80, and this attachment means may take the form as illustrated most clearly in FIG. 10 where it will be noted that the associated open end of the conduit means 80 opens into the interior of the attachment means 90 which actually forms an enclosure having an opening 92 at one portion thereof. This opening may be of a size so as to fit about a person's head and is preferably provided with an elastic means in the form of a band or the like adjacent to the opening so as to cause the opening to fit tightly about a person's head. This enclosure means may also be provided with suitable vent means as is conventional in the art so as to provide a means for escape of the air from the enclosure means, such vent means being indicated by a plurality of holes 93 provided through the wall thereof.

The enclosure means is formed of a suitable flexible material such as a thin plastic substance, and it may be provided with a plurality of circumferentially extending pleats 94 to permit ready collapse thereof and to enable it to conform to the desired shape. The enclosure means is also provided with a strap 96 fixedly secured thereto, the strap permitting the enclosure means to be readily carried or hung up in a desired position.

As illustrated in FIG. 10, a plurality of baby bottles indicated generally by reference numeral 100 are disposed within the enclosure means, and it is apparent that when the apparatus is connected with the hot air system of the vehicle, hot air may be circulated within the enclosure means and thence out through the vents 93 and the opening 92 so as to cause hot air to circulate about the bottles 100 and warming them as desired. On the other hand, if the apparatus is connected with the cooling system of the vehicle, the bottles may be maintained in a desired cooled position.

It is apparent from FIG. 1 that the apparatus can be utilized as a conventional hair drier while a person is riding in a vehicle. Additionally, it is evident from an inspection of FIG. 10 that the same apparatus can be employed either to warm or cool food or beverages as the case may be. Additionally, clothes or diapers or the like may be placed within the enclosure means to be dried if desired. It will also be evident that the strap 96 can be employed for carrying the closure means in such a manner that it serves as a carrying bag.

Referring now particularly to FIG. 11 of the drawings, a still further modified form of the invention is illustrated wherein an enclosure means indicated generally by reference numeral 110 is operatively connected with a flexible conduit means 112 which in turn is connected with a suitable source of air within the vehicle. This enclosure means may be formed of the same substance as enclosure means 90 and may also be provided with a plurality of circumferentially extending pleats 114.

Vent means 115 are provided through the wall of the enclosure means to permit air therewithin to be vented therefrom during operation of the apparatus as a hair drier attachment for example.

A hole 116 is provided in the enclosure means, and in this particular modification, a drawstring 118 of conventional construction is provided about opening 116 to permit the size of the opening to be selectively adjusted in accordance with the particular use to which the apparatus is directed. A strap 120 is also secured to the outer surface of the enclosure means to enable the enclosure means to be hung up or carried as desired.

In this particular modification, a strap or the like 124 is provided within the interior of the enclosure means and may be connected at spaced points to the inner surface of the enclosure means and defines a plurality of spaced loops which in effect form pockets for supporting articles within the enclosure means. It is apparent that any suitable construction may be provided for forming such pockets in order to retain articles in operative position while the device is being used.

The apparatus shown in FIG. 11 may be utilized in much the same manner as that shown in FIG. 10, and can be used for the very same purposes. This modification has the additional advantage of providing a drawstring means which enables one to control the amount of air which immediately escapes from the enclosure means and thereby affords some degree of control as to the circulation of air within the enclosure means. It is apparent that in some cases it will be desired to have the opening 116 as large as possible, and in other cases it may be made very small. The pockets will also serve to secure the articles therewithin and to prevent them from bumping into one another, this being a useful function whether the apparatus is simply hung up in operative position or is utilized as a carrying bag and the like.

Referring now particularly to FIG. 5 of the drawings, a modification is illustrated which is particularly adapted for use in warming the feet of a person. In this modification, the enclosure means is indicated generally by reference numeral 130 and includes a hollow body portion 132 which is also preferably made of a flexible plastic substance which may be normally stored in a collapsed condition and which is adapted to be expanded into the operative position as shown by the air pressure therewithin.

The body means 132 is operatively connected with an end portion of a flexible conduit means 134 which in turn is connected with a suitable source of air within the automotive vehicle. Vent means 136 is provided in the upper surface of the body means for venting the air entering the body means. A pair of cuff members 138 which may be formed of a knitted woolen material or the like is provided in the upper surface of the body means and in association with a pair of openings for receiving the feet of a person. It is apparent that the cuff portions 138 are adapted to fit snugly about the ankle areas of a person's leg so as to prevent an excessive amount of air from escaping around this area and for additionally keeping the person's feet warm.

It is apparent that when utilizing the modification shown in FIG. 5, a person can simply insert his feet within the apparatus, preferably after the shoes have been removed, and air is then supplied within the hollow interior of the body means and allowed to circulate about the person's feet and thence out through the vent means 136.

Referring now particularly to FIGS. 6 and 7 of the drawings, a further modified form of the invention is illustrated wherein the attachment or enclosure means is indicated generally by reference numeral 140, and includes a body portion 142 which defines a closed hollow body means formed preferably of a suitable flexible substance such as plastic or the like. This body means is operatively connected with one end of a flexible conduit means 144 which in turn is connected with a suitable source of air within the vehicle.

The body means 142 is provided with a plurality of openings or vents 146 along one side portion thereof, and a plurality of spacer members 150 are disposed in staggered relationship within the interior of the body means, these spacer members extending between the forward and rearward walls of the body means and being suitably secured thereto. The spacer members are preferably formed of a flexible substance such as Styrofoam plastic or the like.

It is apparent that this particular modification as shown in FIGS. 6 and 7, is adapted to be utilized as a heating pad and for this particular purpose is provided of a relatively flattened configuration. As illustrated in FIG. 6, the heating pad may be placed behind the back of a person sitting in a seat 152 of a vehicle, and in this position, the Styrofoam spacers 150 will prevent collapse of the body means.

It is apparent that when the apparatus is utilized as shown in FIG. 6, it serves not only as a comfortable back rest, but also as a means for heating the back of a person. It is also evident that the heating pad arrangement shown in FIGS 6 and 7 may be utilized for heating various other parts of the anatomy as desired and as will be apparent. It is also evident that this heating pad may be wrapped around other articles which it may be desired to heat. It is of course evident in the discussion of each of the modifications in the present invention that all of the various modifications may also be utilized for cooling purposes if so desired.

Referring now particularly to FIGS. 8 and 9 of the drawings, a further modified form of the invention is illustrated wherein the attachment or enclosure means is indicated generally by reference numeral 160 and is connected with one end of a flexible conduit means 162 which has the opposite end thereof operatively connected with a source or air within the vehicle, and preferably to a source of heat, since this particular modification is especially adapted for treating ambulance patients who may perhaps be in the state of shock.

Vent means 164 is provided at the opposite end of the body means for allowing escape of the air circulated within the body means. An integral head rest portion 166 is provided which may be padded with a suitable foam rubber substance or the like so as to support the head of a patient disposed within this particular attachment means. A portion 168 which may be formed of knitted material or the like is provided for receiving the neck portion of a patient and for fitting snugly thereabout to prevent an excessive escape of air in this particular area.

An elongated zipper 170 extends longitudinally down the upper central portion of the body means and is adapted to open the enclosure means so as to dispose the patient's body therewithin. A suitable temperature indicating means such as a thermometer 172 is preferably mounted in the upper wall of the enclosure means so as to enable an attendant to observe the temperature within the enclosure means and to adjust this temperature to the desired degree.

A plurality of hand holes are indicated by reference numerals 174, each of these holes being adapted to receive the hand of an attendant such that the attendant can reach within the enclosure means to perform any desired function. As shown, an attendant is indicated as supplying plasma to the patient disposed within the enclosure means.

Referring particularly to FIG. 9, it will be seen that each of the hand holes 174 includes a reinforcing means 180 for retaining the shape of the hand hole since the body means 160 is preferably formed of a flexible plastic material. A flap valve 182 formed of rubber or the like is provided in association with each of the hand holes and is adapted to close off the hand hole so as to normally prevent the escape of air therethrough. This flap valve is mounted as by stitching or the like as indicated by reference numeral 164 so as to be pivoted downwardly when it is desired to gain entrance to the interior of the enclosure means. It is apparent that this valve means will serve as an automatic closure means for each of the hand holes and which at the same time permits ready insertion of the attendant's arm within the enclosure means.

Referring now particularly to FIGS. 12 and 13 of the drawings, a further modified form of the invention is illustrated wherein the connecting means is of a different construction in order to enable the flexible conduit means to be operatively associated with a source of air which is normally associated with air-conditioning type air outlets in automotive vehicles.

In this particular modification, a portion of the automotive vehicle is indicated generally by reference numeral 190 and is provided with an air outlet portion 192 including a plurality of louvers 194 the position of which may be adjusted by employing an adjusting knob 196.

In this particular modification, the connecting means is indicated generally by reference numeral 200 and includes a flexible conduit means 202 similar to that previously described. The end portion of flexible conduit means 202 is operatively connected with the generally funnel-shaped portion 204 which may be formed for example of a relatively flexible plastic material.

Funnel-shaped portion 204 is connected with an annular rigid member 206 by means of a split band 208 which is adapted to clamp the open end portion of funnel-shaped portion 204 to the outer periphery of annular portion 206 which is preferably provided with a circumferentially extending groove 207 which cooperates with the split band 208 for locking the open end portion of the tubular portion 204 in position.

An annular gasket member 210 is provided and as shown in FIG. 13 in the operative position is adapted to be clamped between the member 206 and the adjacent air outlet openings portion so as to provide a fluid-tight seal therewith.

The means for holding and retaining the connecting means in the operative position shown comprise a pair of resilient hook means indicated generally by reference numerals 220, the details of which are shown in FIG. 13. Each of the hook means is of identical construction, and accordingly, a description of one of these hook means will suffice for both, it being noted that the hook means are disposed at diametrically opposite portions of the annular member 206.

As seen in FIG. 13, each of hook means 220 includes a hook shaped outer end portion 222 which is adapted to be slipped over and to snugly engage one of the louver members 194. The hook means also includes an elongated shank portion 224 which is slidably disposed within a cooperating opening formed in member 206. The opposite end of the hook means is provided with an enlarged head portion 226, and a compression spring 230 is seated between head portion 226 and the adjacent portion of the annular member 206.

It is apparent that the spring means 230 in the operative position as shown in FIGS. 13 will serve to hold the connecting assembly in the relationship shown and that the connecting means may be simply inserted in position by slipping the hook members through the louver means as by rotating the hook members 90 degrees from the position shown, whereupon the hook members can then be rotated into the operative position, and the springs released so as to permit the springs to urge the hook members into the relationship shown in FIG. 13.

It is apparent from the foregoing that there is provided according to the present invention new and novel means for use with the air flow apparatus of an automotive vehicle. This apparatus may be utilized for heating, cooling or for supplying fresh air to any desired area or articles within the vehicle. The present invention provides apparatus which can be readily attached and sealed to a source of air, and means is provided for remotely controlling the air flow through the apparatus. In one form of the invention, the attachment means of the apparatus is adapted to fit about the head of a person and can be utilized for drying one's hair while in motion in the vehicle. This same attachment means can be utilized for warming or cooling food or beverages or for drying clothes and the like, and further may also be employed as a carrying bag. In another modification of the invention, the attachment means may be utilized as a foot warming device, and in a further modification the attachment means may be employed as a heating pad. In a still further modified form of the attachment means, the enclosure means thereof is adapted to receive a human body with the head extending therefrom in a cushioned position, this particular modification being especially adapted for use in treating shock victims and the like and affording ready access to the interior thereof. This latter modification may also possibly be utilized as a sleeping bag under certain circumstances.

While the present invention has been particularly illustrated and described as utilized in connection with an automotive vehicle, it should also be understood that the invention apparatus is equally suited for use in an airplane, on a bus, or a train. In other words, the present invention may be utilized with various different types of conveyances, and has general utility.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. In combination, an automotive vehicle having a source of heated air, elongated flexible conduit means having a connecting end portion at one end thereof and a hair dryer attachment means connected with the opposite end thereof for directing air from the conduit means in the desired manner, said attachment means comprising an enclosure means of flexible material for fitting about a person's head, said enclosure means having an opening therein, means adjacent said opening for varying the size of said opening, connecting means operatively associated with said source of air and including a tubular support portion, the connecting end portion of said flexible conduit means being disposed within and supported within said tubular support portion, said connecting end portion of the conduit means having an annular magnetic member supported thereat, said connecting means including a cooperating annular magnetic member adapted to engage said first-mentioned magnetic member, air flow control means within said connecting means for controlling the flow of air therethrough, said air flow control means comprising a remotely operated valve means.

2. In combination, an automotive vehicle having a source of heated air, elongated flexible conduit means having one end thereof operatively connected with said source of air, an attachment means operatively connected with the opposite end of said conduit means, said attachment means comprising an enclosure means formed of flexible material and a single unobstructed cavity therewithin to receive completely therewithin all of the body of a person except the neck and head portion, vent means formed therein for venting air passing through the enclosure means from said source of air, said enclosure means including an opening therein through which the neck portion and the head of a person are adapted to extend, selectively operable closure means for said enclosure means so as to permit ready opening and closure of the enclosure means, a plurality of holes formed in said enclosure means for admitting a person's hand and arm, flap means normally closing each of said hand and arm holes formed in said enclosure means to prevent an excessive escape of air from said enclosure means.

3. Apparatus as defined in claim 2 wherein said enclosure means has opposite end portions, said conduit means being operatively connected with one of said end portions, said vent means being formed in the opposite end portion of the enclosure means.

References Cited by the Examiner

UNITED STATES PATENTS

| | | | |
|---|---|---|---|
| 1,314,697 | 9/1919 | Pelton | 237—12.3 |
| 2,540,547 | 2/1951 | Rodert | 165—46 X |
| 2,657,396 | 11/1953 | Klein et al. | 165—46 X |
| 2,821,895 | 2/1958 | Allabaugh | 98—37 |
| 2,824,575 | 2/1958 | Rosen. | |
| 2,825,338 | 3/1958 | Schnepf et al. | 165—46 X |
| 2,947,507 | 8/1960 | Schlage et al. | |
| 3,064,362 | 11/1962 | Fortnam | 34—99 |
| 3,155,318 | 11/1964 | Kirkham | 237—12.3 |
| 3,157,475 | 11/1964 | Stainbrook | 34—99 X |

FOREIGN PATENTS

| | | |
|---|---|---|
| 139,048 | 3/1919 | Great Britain. |
| 176,552 | 3/1922 | Great Britain. |

ROBERT A. O'LEARY, *Primary Examiner*.

M. A. ANTONAKAS, *Assistant Examiner*.